United States Patent [19]

Kakuta et al.

[11] Patent Number: 4,572,930
[45] Date of Patent: Feb. 25, 1986

[54] MULTIPLE SWITCH USING A ROTARY ACTUATOR

[75] Inventors: Toshio Kakuta, Higashiosaka; Toshio Kikuchi, Nara, both of Japan

[73] Assignee: Hosiden Electronics Co., Ltd., Osaka, Japan

[21] Appl. No.: 626,099

[22] Filed: Jun. 29, 1984

[30] Foreign Application Priority Data

Jul. 18, 1983 [JP] Japan .................................. 58-131564

[51] Int. Cl.[4] ........................................... H01H 21/04
[52] U.S. Cl. .................... 200/5 R; 179/159; 200/6 BA; 200/6 BB
[58] Field of Search ............... 179/164, 159, 169; 200/5 R, 6 B, 6 BB

[56] References Cited

U.S. PATENT DOCUMENTS

3,719,788  3/1973  Holland et al. ............... 200/6 BB
4,456,799  1/1984  Haskins .......................... 200/6 BB

Primary Examiner—A. D. Pellinen
Assistant Examiner—Morris Ginsburg
Attorney, Agent, or Firm—Jones, Tullar & Cooper

[57] ABSTRACT

The present invention discloses a multiple switch using a rotary actuator comprising a stationary terminal block in which a plurality of stationary terminals are arranged, a movable terminal block in which a plurality of movable terminals are arranged for the elastic contact with the stationary terminals, an actuator incorporated into a body to be rotatable at a specified angle when an external force is applied by means of a plunger or the like and returning automatically to its original position by means of an elastic member when the external force is released, a first projection group having at least one projection mounted on the actuator pressing at least one movable terminal to separate the movable terminal from the stationary terminal, a second projection group having at least one projection mounted on the actuator releasing the pressure to at least one movable terminal to come in the elastic contact with the stationary terminal, an the on-off control thereof being carried out based on the principle of a lever.

31 Claims, 15 Drawing Figures

MULTIPLE SWITCH USING A ROTARY ACTUATOR

BACKGROUND OF THE INVENTION

The present invention relates to a multiple switch and more particularly to a multiple switch used preferably for a hook-switch of a telephone set.

In the known hook-switch conventionally used, the on-off control of the switch is carried out by sliding an actuator included therein. Such slide switch, however, has a serious problem of requiring a large size for itself, partly because it is necessary to secure an additional spacing inside the housing depending upon the sliding distance of the actuator and partly because it is also necessary for a return spring of the actuator to have a rather prolonged length so that the actuator may be actuated by a force as small as possible. Such conventional slide switch has another disadvantage of requiring a large number of components and parts since the on-off control thereof is carried out through a separator arranged between the actuator and the switching part, resulting in a rather complicated assembling process thereof. Furthermore, said conventional switch has further disadvantages of not being easily adaptable to the variation of switching sequence and of less reliability of the contact between a movable terminal and a stationary terminal. Besides, some lubricant is required to be fed to the contact area between said two terminals, sometimes getting into trouble caused by the lubricant.

SUMMARY OF THE INVENTION

An object of the present invention is therefore to provide an endurable multiple switch, wherein the contact and separation of the movable terminal with and from the stationary terminal is carried out by turning an actuator based on the principle of a lever so that the switching control may be successfully accomplished using a rather small force, irrespective of the quantity of circuit.

A further object of the present invention is to provide a multiple switch, wherein, compared with the above-discussed conventional slide type actuator, it is sufficient for a spacing necessary for the actuation of the actuator inside the body thereof to be rather small, and an elastic member for automatic return of the actuator is also of small size, resulting in an effectively small-sized switch as a whole.

A still further object of the present invention is to provide a compact multiple switch, wherein every excess component or part such as separator necessary in the prior art is not required any more, and a plurality of movable terminals as well as a plurality of stationary terminals are integrated into one unit by means of a movable terminal block as well as a stationary terminal block, resulting in a compact switch to be easily assembled.

A yet further object of the present invention is to provide a multiple switch, wherein each movable terminal comes in contact with and separates from the corresponding stationary terminal by the actuation of a cam performed by at least one projection belonging to a first projection group and the projection belonging to a second projection group both mounted on the actuator, and the position and/or configuration of said each projection is changeable to give variation easily to the switching sequeance thereof.

Another object of the present invention is to provide a multiple switch, wherein the actuation force of the actuator can be optionally controlled by setting up the distance between the turning center of the actuator and the point of application of some external force by means of a plunger or the like, based on the principle of a lever without changing or keeping constant the urging force of the elastic member.

Still another object of the present invention is to provide a multiple switch, wherein a contact area of each movable terminal for an elastic contact with each stationary terminal is bifurcated, and in cooperation with a little cleaning effect performed when both terminals come in contact with each other, the reliability of the contact therebetween is greatly improved.

Yet another object of the present invention is to provide a multiple switch, wherein any lubricant is not required for the contact area between the movable terminal and the corresponding stationary terminal, the switch being thereby successfully prevented from any trouble caused by the lubricant.

An additional object of the present invention is to provide a multiple switch, wherein the contact area of each stationary terminal with the corresponding movable terminal is formed to have some slope or inclination so that the contact area may come in contact with the bifurcated part of each movable terminal at some time lag, being effectively prevented from trouble caused by an arc resulting in the improvement of the reliability of the contact between both terminals.

A still additional object of the present invention is to provide a multiple switch, wherein the manufacturing process thereof can be automated starting from the formation of the plurality of movable terminals and stationary terminals up to the formation of the movable terminal block and the stationary terminal block into both of which said terminals are inserted to be held therein, resulting in the reasonable saving of the manufacturing cost.

A yet additional object of the present invention is to provide a multiple switch, wherein the contact area of each terminal is composed of a thick clad of silver or silver alloy to be sufficiently endurable against the load of a telephone set, thereby being preferably applicable to the hook switch of the telephone set.

Other objects, features and advantages of the present invention will become apparent in the course of the following description with the accompanying drawings.

BRIEF DESCRIPTION OF THE DRAWINGS

In the accompanying drawings forming a part of the present application, and in which like parts are designated by like reference numerals throughout the same.

DESCRIPTION OF THE PREFERRED EMBODIMENTS

Referring now to the accompanying drawings, some embodiments in accordance with the present invention are described in detail hereinafter.

Figure 1:
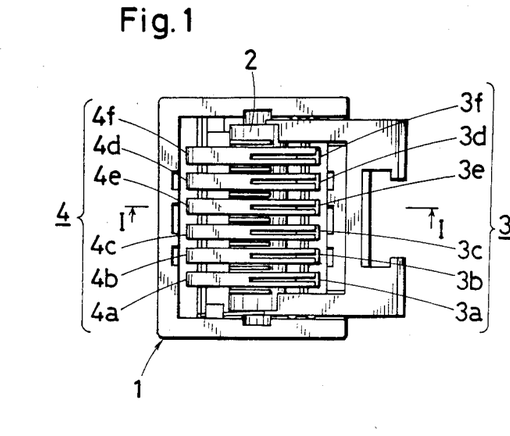
FIG. 1 is a plan view of an uncovered multiple switch embodying the present invention.
Figure 2:
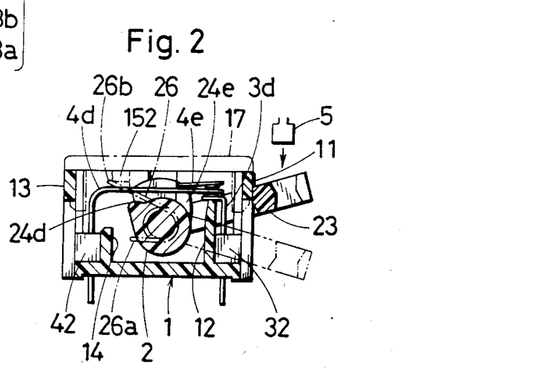
FIG. 2 is a sectional view taken on the plane of the line I—I of FIG. 1 and illustrating the actuator situated at the normal position.
Figure 3:
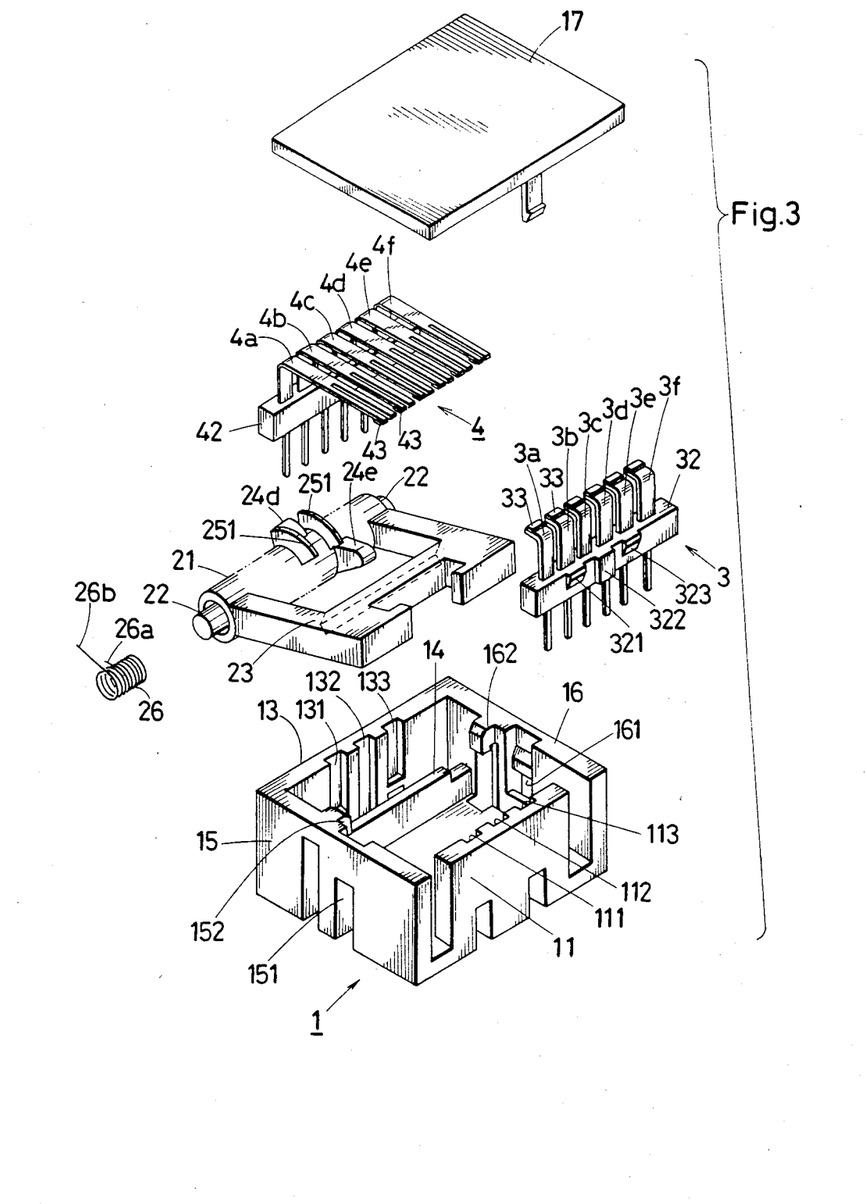
FIG. 3 is a perspective view of the multiple switch of FIG. 1 being exploded into each principal element thereof.

Referring first to FIG. 1, FIG. 2 and FIG. 3, a body of the multiple switch comprises a housing 1 with its upper side open and a cover 17 for closing the upper opening. Both the housing 1 and the cover 17 are composed of an electrically insulating synthetic resin. An actuator 2, a stationary terminal block 3 and a movable terminal block 4 are included in the housing 1, respectively. The actuator 2 and block bases 32, 42 for the blocks 3, 4 are also composed of the electrically insulating synthetic resin.

The stationary terminal block 3 comprises a plurality (6 pieces for example) of stationary terminals 3a, 3b, 3c, 3d, 3e, 3f of electro-conductive metal arranged at a certain interval and inserted into the block base 32 to be fixed thereto as illustrated in FIG. 2 and FIG. 3. The upper end of each stationary terminal 3a, 3b, 3c . . . is bent toward the inside thereof making a right angle, and a contact area 33 is mounted on each of said upper end. In this manner, the stationary terminal block 3 is accommodated and secured between a side wall 11 and an inner wall 12 of the housing 1 as illustrated in FIG. 2 by forcing the stationary terminal block 3 down into the housing 1 while fitting convex portions 321, 322, 323 formed on the block 32 with guide grooves 111, 112, 113 formed on the inner surface of the side wall 11 of the housing 1 as illustrated in FIG. 3. The bent portion of the upper end of each stationary terminal 3a, 3b, 3c . . . is supported on the upper end of the inner wall 12.

On the other hand, the movable terminal block 4 of electro-conductive metal comprises the same number of L-shaped movable terminals 4a, 4b, 4c, 4d, 4e, 4f as said stationary terminals arranged and inserted into the block base 42 to be fixed thereto as illustrated in FIG. 2 and FIG. 3, said movable terminals 4a, 4b, 4c . . . also being of electro-conductive metal, a little thin and having elasticity. A contact area 43 is mounted on every lower end of each movable terminal 4a, 4b, 4c . . . . In the same manner as said stationary terminal block 3, the movable terminal block 4 is accommodated and secured between another side wall 13 and inner wall 14 of the housing 1 as illustrated in FIG. 2 by forcing the terminal block 4 down into the housing 1 while fitting three convex portions (not illustrated) formed on the block base 42 with three guide grooves 131, 132, 133 formed on the inner surface of the side wall 13 of the housing 1. Thus, the contact area 43 at the end of each movable terminal 4a, 4b, 4c . . . keeps elastic contact with the contact area 33 of each stationary terminal 3a, 3b, 3c . . . so long as the projection of the actuator 2 is not in contact with each movable terminal 4a, 4b 4c . . . .

Said actuator 2 comprises a cylinder 21 on which a plurality (6 pieces for example) of projections 24a, 24b, 24c, 24d, 24e, 24f and a plurality (7 pieces for example) of isolation flanges 251 are alternately formed, shaft members 22 of minor diameter provided respectively on both ends of said cylinder 21, and a C-shaped arm 23 projectionally provided toward the lateral direction of the cylinder 21. A coil spring 26 serving as the elastic member is mounted on one end or both ends of the cylinder 21, and one end of said coil spring 26 is engaged with a slot 21a to be secured thereto, said slot 21a being formed in the cylinder 21 as illustrated in FIGS. 3 through 6.

Said shaft members 22 are rotatably supported on bearing apertures 151, 161, respectively, of a front wall 15 and a back wall 16, and the other end 26b of the coil spring 26 is retained on the portions 152 or 162 also formed on the front wall 15 and the back wall 16 respectively.

In this manner, the actuator 2 is urged counter-clockwise by means of the coil spring 26 in the normal state thereof as illustrated in FIG. 2, and the arm 23 is stopped when coming into contact with the upper part of the side wall 11 of the housing 1 at the inoperative position indicated by the solid line. When the external force is applied to the arm 23 by the plunger 5 or the like, the arm 23 is forced down or lowered, and the actuator 2 turns clockwise up to the operative position where the arm 23 comes in contact with the lower part of the side wall 11 to be stopped as indicated by the chain line of FIG. 2. On the other hand, when the external force is released from the arm 23, the actuator 2 automatically returns to its original position forced by the coil spring 26 as indicated by the solid line of FIG. 2. The turning angle of the actuator 2 may be selective or set up at one's option, however, in case of using the multiple switch as a hook switch of a telephone set, it is preferred to make said angle approximately 30°, i.e. to make the stroke of the plunger 5 approximately 6.5 mm.

The projections 24a, 24b, 24c, 24d, 24e, 24f formed on the surface of the cylinder 21 of the actuator 2 are classified into two groups in view of their functions. The projections which belong to the first projection group are those 24a, 24b, 24c, 24d formed on the left side with respect to the center of the cylinder 21 (on the opposite side of the arm 23) in FIG. 4. When the actuator 2 is at the inoperative position (indicated by the solid line of FIG. 2), said projections 24a, 24b, 24c, 24d of the first projection group are not in contact with the movable terminals 4a, 4b, 4c, 4d, and when the actuator 2 is turned by the application of the external force, the top end of each projection of said first projection group pressing the movable terminals 4a, 4b, 4c, 4d, comes to separate or disconnect said movable terminals from the stationary terminals 3a, 3b, 3c, 3d. Accordingly, it is possible to set up various specified timings for the separation of the movable terminals 4a, 4b, 4c, 4d from the stationary terminals 3a, 3b, 3c, 3d by changing the inclination (position in the turning direction) and the height (diameter of the turning locus) of the top end.

Figure 4:
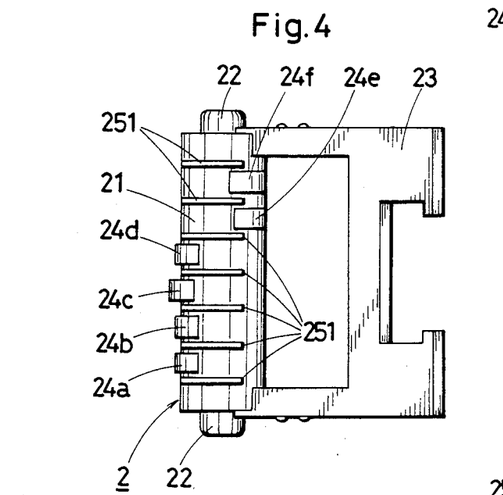
FIG. 4 is a plan view of the actuator illustrated in FIG. 3.
Figure 5:
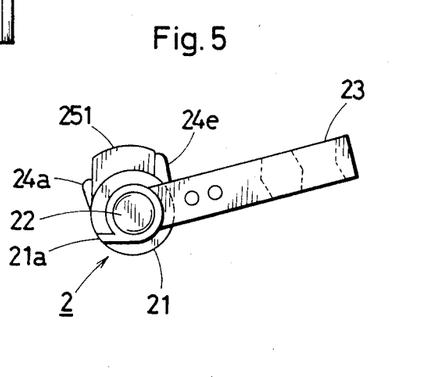
FIG. 5 is a front view of the actuator illustrated in FIG. 3.

The remaining projections which belong to the second projection group are those 24e, 24f provided on the right side with respect to the center of the cylinder 21 of the actuator 2 (on the side of the arm 23) in FIG. 4. When the actuator 2 is situated at the normal, i.e. inoperative position, the top end of the projections of the second projection group applying pressure to the movable terminals 4e, 4f separates them from the stationary terminals 3e, 3f, and when the actuator turns, said projections 24e, 24f releasing the pressure to the movable terminals 4e, 4f bring them into elastic contact with the stationary terminals 3e, 3f. Accordingly it is also possible to set up various specified timings for the connection of the movable terminals 4e, 4f with the stationary terminals 3e, 3f.

Figure 6A:
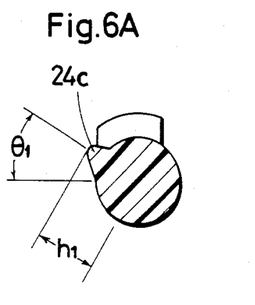
FIG. 6A, FIG. 6B, FIG. 6C and FIG. 6D are sectional views of a projection of the actuator respectively illustrating the position and the configuration thereof.
Figure 6B:
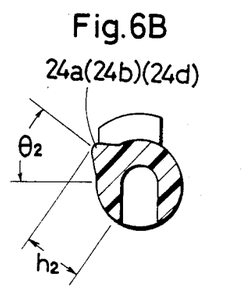
Figure 6C:
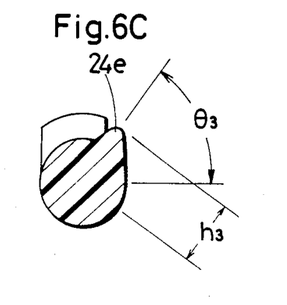
Figure 9:
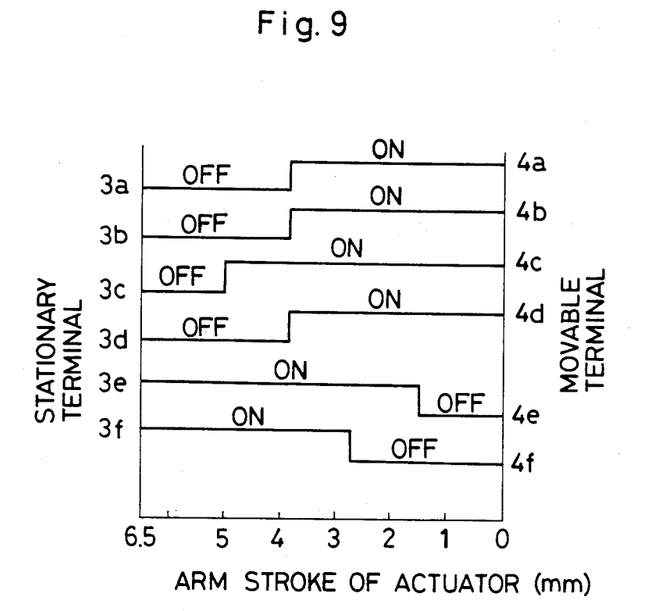
FIG. 9 is a timing chart illustrating one mode of on-off control of the multiple switch.

In the foregoing embodiment, each inclination $\theta_2$ of the projections 24a, 24b, 24d of the actuator 2 is set up to 35° while the height $h_2$ from the center thereof being set up to 4.1 mm as illustrated in FIG. 6B, the inclination $\theta_1$ of the projection 24c being set up to 29.5° while the height $\theta_1$ being set up to 4.2 mm as illustrated in FIG. 6A, the inclination $\theta_3$ of the projection 24e being set up to 55° while the height $h_3$ to 4.5 mm, and the inclination $\theta_4$ of the projection 24f being set up to 59° while the height $h_4$ to 4.5 mm, thus a state of on-off control shown in FIG. 9 being accomplished while turning the actuator 2 by 30°, i.e. moving the arm 23 6.5 mm in the stroke thereof.

Figures 6D, 7:
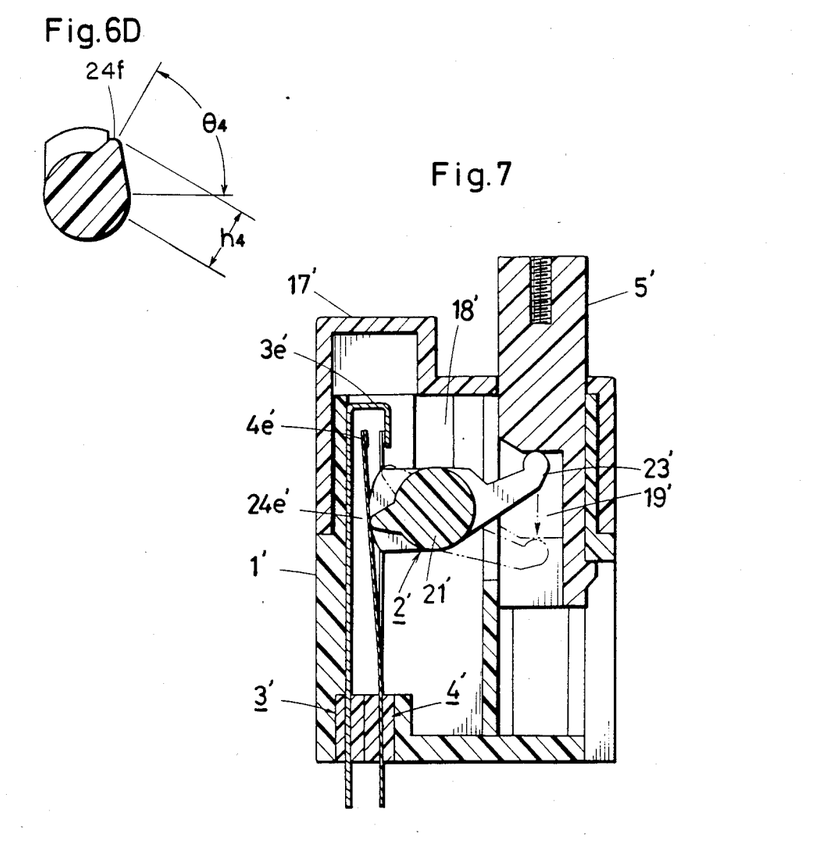
FIG. 7 is a sectional view of another embodiment of a multiple switch in accordance with the present invention.
Figure 8:
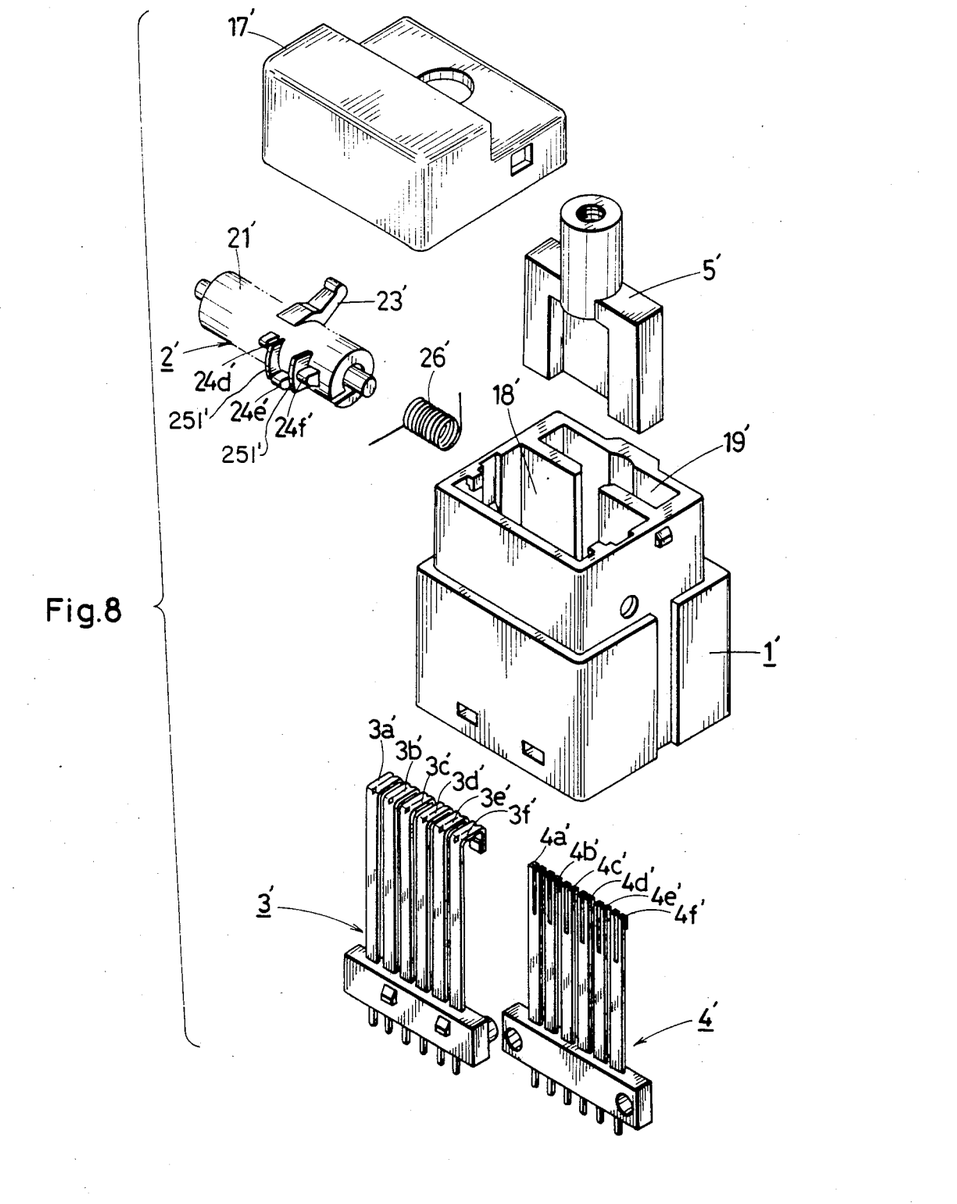
FIG. 8 is a perspective view of the multiple switch of FIG. 7 being exploded into each principal element thereof.

Referring now to FIG. 7 and FIG. 8 respectively illustrating a sectional view and a perspective view of another embodiment of the multiple switch in accordance with the present invention, a room 18' into which an actuator 2', a stationary terminal block 3' and a movable terminal block 4' are to be incorporated together, and another room 19' into which a plunger 5' is to be inserted, are provided inside a housing 1'. In the room 18', the stationary terminal block 3' in which a plurality of inverted L-shaped stationary terminals 3a', 3b', 3c', 3d', 3e', 3f', are arranged in parallel to one another is perpendicularly provided facing the movable terminal block 4' in which a plurality of movable terminals 4a', 4b', 4c', 4d', 4e', 4f' are arranged in parallel to one another, and the actuator 2' is arranged by the side thereof.

The actuator 2', in the same manner as the first embodiment, comprises projections 24d', 24f' belonging to the first projection group for the separation of the movable terminals from the stationary terminals by pressing the movable terminals when the actuator 2' is turned, a projection 24e' which belongs to the second projection group and for the elastic contact of the movable terminals with the stationary terminals by releasing the pressure to the movable terminals, and isolation flanges 251'. Said projections 24d', 24f' of the first projection group, the projection 24e' and the flanges 251' are formed on the external surface of a cylinder 21', and the actuator 2' turns when applied an external force thereto and returns when such force is released therefrom both by means of coil spring 26' in the same manner as the first embodiment. In this actuator 2', however, an almost straightforward arm 23' is projectionally mounted in place of the C-shaped arm, said arm 23' being different from the foregoing first embodiment is arranged above a room 19'. It is to be noted that three projections of the actuator 2' are omitted in FIG. 8.

Thus, in accordance with the multiple switch embodying the present invention, when the external force is applied to the actuator 2, 2' by means of the plunger 5, 5', the actuator 2, 2' turns against the urging force of the elastic member 26, 26'. Then by means of the projections of the first projection group pressing the movable terminals, the movable terminals situated in the state of "ON" and in contact with the stationary terminals come to separate or disconnect from the stationary terminals to be switched over to "OFF", and by means of the projection or projections of the second projection group releasing the pressure applied to the movable terminals, the movable terminals situated in the state of "OFF" and in separation from the stationary terminals come in elastic contact with the stationary terminals to be switched over to "ON", resulting in smooth on-off control at a specified time lag. Said time lag can be optionally set up just by changing the inclination and the height of each projection of the actuator 2, 2' as above-described. The force applied to the arm 23, 23' of the actuator 2, 2' is also controllable based on the principle of a lever by changing the length from the center of the cylinder 21, 21' up to the point of application of the force. Further, since the on off control is carried out using the pressure applied by means of the projections of the first projection group or the release thereof by means of the projection or projections of the second projection group, the over-load to the movable terminals can be effectively prevented, resulting in the prolonged lifetime thereof, the durability of the switch as a whole being much improved,. Furthermore, by employing the rotary actuator 2, 2', it is not necessary to secure a certain spacing for the sliding distance as is the case of the conventional slide type actuator, and accordingly the height of the body can be reduced to less than ½ of the conventional actuator enabling a small-sized or compact multiple switch, the components or parts such as separator required for the conventional switch being unnecessary, resulting in the easy assembling thereof. Besides, since the contact area of the movable terminals with the stationary terminals is formed into a bifurcation, the elastic contact is assured between both terminals, thereby the reliability of contact being much improved over the prior arts. Such advantage will be further accelerated because of a self-cleaning effect performed when the movable terminals come in contact with the stationary terminals. In addition, each contact area 33, 43 is formed of a thick silver or silver alloy clad to be sufficiently adaptable to the load thereto (56V, 0.1A, 5Henry). Since the contact and separation control of the contact areas of both terminals is not carried out by means of a sliding actuator, any lubricant is not necessary, thereby the switch in accordance with the present invention being prevented from any trouble caused by the lubricant. Further, each of said stationary terminal 3a, 3b, 3c . . . and the movable terminals 4a, 4b, 4c . . . can be formed of a sheet of metallic plate by punching while keeping some part thereof still connected (or not cut off), and both stationary terminal block 3 and movable terminal block 4 can be formed while holding said terminals (with a part thereof still connected to each other) in a block forming mold, then cutting off every connected part among terminals to complete an incorporation process of the terminals into the stationary terminal block 3 or the movable terminal block 4. By employing such a method, the molding of the blocks with each terminal inserted therein can be easily automated resulting in a considerable decrease of manufacturing cost. Moreover, it is to be noted that a necessary number or quantity of the stationary terminals and the movable terrminals are incorporated into respective blocks to be one unit for each necessary circuit, a simple incorporation of said respective blocks into the housing is quite sufficient for the purpose of including necessary number of circuits, resulting in the extremely easy assembly of the multiple switch.

Any of the foregoing embodiments refers to a normal actuation-type multiple switch wherein the actuator 2, 2' is urged in the direction of the cover 17, 17' located above for the actuation toward the printed board by means of the plunger 5, 5' or the like. On the other hand, as illustrated in FIG. 10 for example, by modifying the cover (and the housing) beforehand and replacing the actuator only, it is possible to assemble alternatively either into the foregoing normal actuation type multiple switch or into a reverse actuation type multiple switch in which the actuator is actuated from the side of the printed board, the positional relation being reversed between the operative position and the inoperative position of the actuator.

Figure 10:
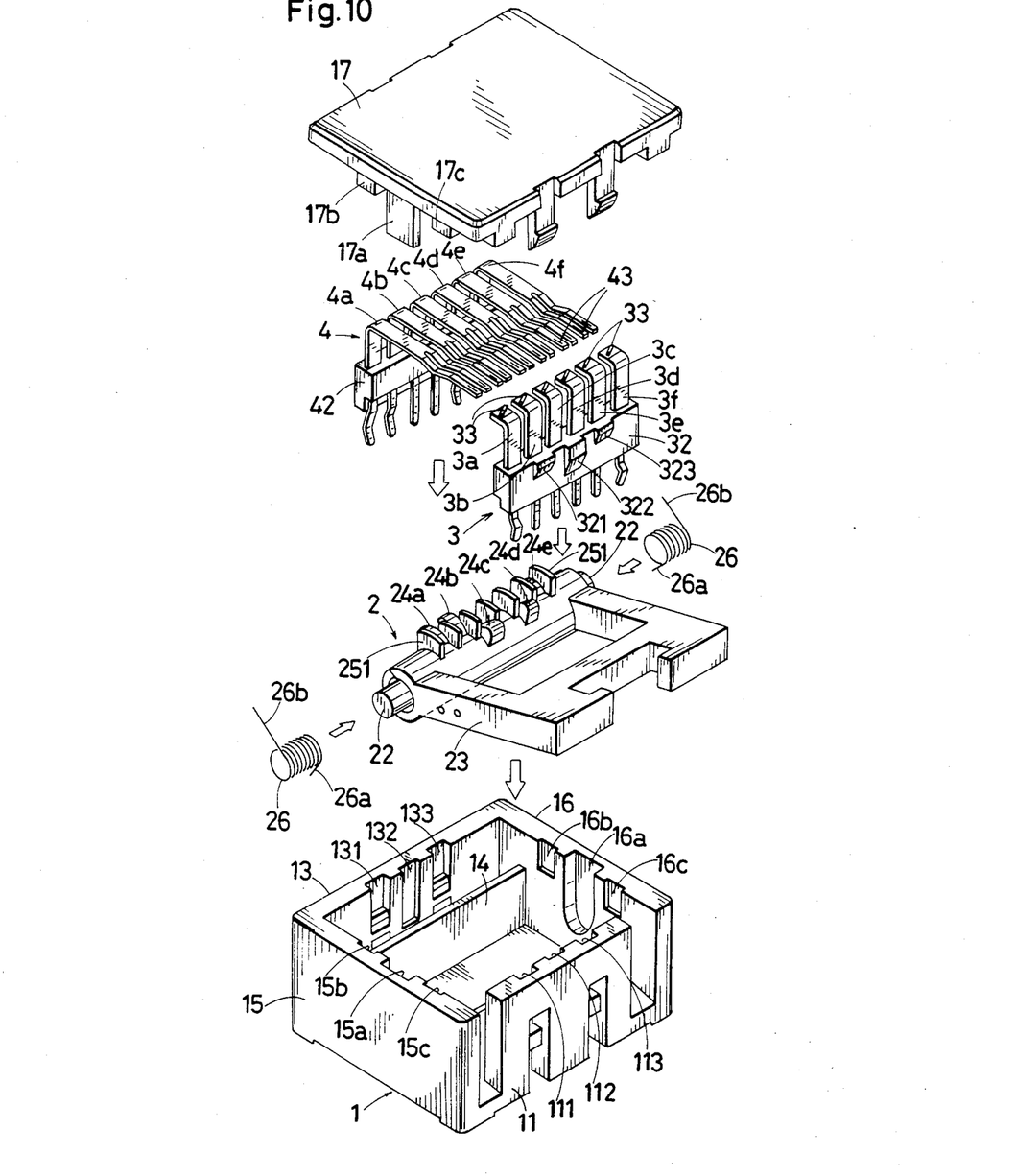
FIG. 10 is an exploded perspective view of a further embodiment of a multiple switch in accordance with the present invention.

A switch illustrated in FIG. 10 is one mode of such reverse actuation type multiple switch wherein the cover and the housing of the switch illustrated in FIG. 3 are partially modified so as to be assembled alternatively into a normal actuation type swith or the reverse actuation type one. In the following description, the same parts as FIG. 3 are designated by the same reference numerals as FIG. 3 for the sake of convenience.

Figure 11A:
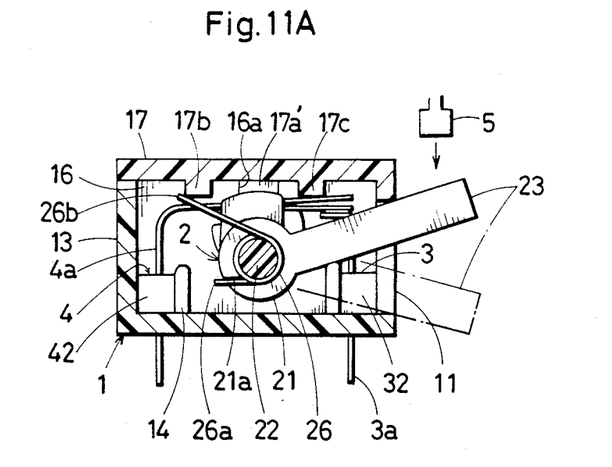
FIG. 11A is a sectional view illustrating the multiple switch assembled into a normal actuation type switch.
Figure 11B:
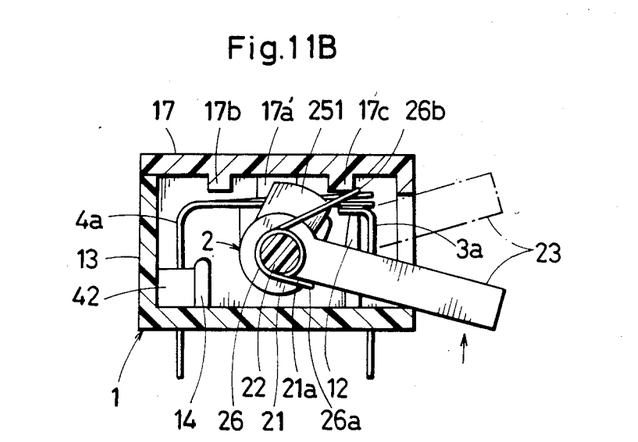
FIG. 11B is a sectional view illustrating the multiple switch assembled into a reverse actuation type switch.

The multiple switch according to this embodiment comprises projections 17a, 17a' provided for the prevention of the shafts 22, 22 of the actuator 2 from moving upward. The projections 17a, 17a', under the cover 17, are rotatably engaged with each groove 15a, 16a formed on the front wall 15 and the back wall 16 of the housing 1 by engageably inserting the projections 17a, 17a' into the grooves 15a, 16a. A first retention part 17b projectionally provided for retaining one end 26b of each coil spring 26 while another end 26a thereof is retained in the slot 21a of the cylinder 21 (a part to be engaged with the groove 16b is not illustrated in FIG. 10). A second retention part 17c is also projectionally provided part to be engaged with the groove 16c is not illustrated in FIG. 10). The first and second retention parts 17b, 17c are engaged with the grooves 15a, 16b respectively by being engageably inserted into said grooves 15b, 16b, 15c, 16c. By employing such a construction, as illustrated in FIG. 11A, when one end 26a of each coil spring 26 is retained on said first retention part 17b of the cover 17 by means of the same actuator 2 as FIG. 3, the actuator is urged upward in the same manner as the mentioned embodiments, thus being formed or assembled into the normal actuation type multiple switch. On the other hand, as illustrated in FIG. 11B, when another end 26b of each coil spring 26 is retained on said second retention part 17c by means of the actuator 2 wherein the slot 21a with which the end 26a of the coil spring 26 is to be engaged is formed in the reverse direction to that of FIG. 11A, the actuator 2 is urged downward, thus being formed or assembled into the reverse actuation type multiple switch by the simple modification of the actuator 2. In this respect, there is no limitation as to the number of coil springs 26, only one such spring being sufficient for the actuator as the case may be.

Furthermore, in this embodiment, as illustrated in FIG. 10, the contact area 33 of each stationary terminal 3a, 3b, 3c . . . coming in the elastic contact with the bifurcated end of each movable terminal 4a, 4b, 4c . . . is so formed as to have some inclination (45° approx.) with respect to each movable terminal. In this manner, the movable terminals come in contact with the stationary terminals like a crossbar, and the reliability of contact being much improved, a certain time lag being secured in the contact between both terminals in cooperation with the bifurcation of the contact area of each movable terminal, resulting in an effective preventive device against the generation of an arc.

It will be evident to those skilled in the art that the present invention is not limited to the details of the foregoing illustrative embodiments, and that the present invention may be embodied in other specific forms without departing from the essential attributes thereof, and it is therefore desired that the foregoing embodiments be considered in all respects as illustrative only and not restrictive, reference being made to the appended claim rather than the foregoing description, and all changes which come with the meaning and the range of equivalency of the claim are therefore intended to be embraced therein.

What is claimed is:

1. A multiple switch using a rotary actuator comprising:
   a body,
   a stationary terminal block provided in the body, and in which a plurality of stationary terminals are arranged in parallel with one another,
   a movable terminal block provided in the body, and in which a plurality of movable terminals are arranged to come in elastic contact with a respective one of said stationary terminals,
   a rotary actuator supported on the body to be rotatable through a specified angle in a turning direction between an inoperative position and an operative position, said rotary actuator including a first projection group formed thereon in one location relative to the turning direction, said first projection group having at least one projection and a second projection group formed thereon in another location relative to the turning direction, said second projection group having at least one projection, each projection belonging to the first projection group separating a respective movable terminal from its corresponding stationary terminal by pressing the movable terminal, and each projection belonging to the second projection group bringing a respective movable terminal into elastic contact with its corresponding stationary terminal by releasing the pressure from the movable terminal in accordance with a turning movement of the rotary actuator between the inoperative position and the operative position. and
   an elastic interposed between the body and the rotary actuator to rotatably urge the rotary actuator in the inoperative direction thereof.

2. A multiple switch as claimed in claim 1, wherein a position of at least one projection belonging to said first projection group is biased toward the turning direction of the rotary actuator with respect to the other projections belonging to the first projection group.

3. A multiple switch as claimed in claim 1, wherein a turning locus of top end of at least one projection belonging to the first projection group has a different radius from the locus of the top end of the other projections belonging to the first projection group.

4. A multiple switch as claimed in any of claims 1 through 3, wherein a position of at least one projection belonging to said second projection group is biased toward the turning direction of the rotary actuator with respect to the other projections belonging to the second projection group.

5. A multiple switch as claimed in any of claims 1 through 3, wherein the turning locus of the top end of at least one projection belonging to said second projection group has a different radius from the locus of the top end of the other projections belonging to the second projection group.

6. A multiple switch as claimed in any of claims 1 through 3, wherein a contact area of each movable terminal with the corresponding stationary terminal is bifurcated.

7. A multiple switch as claimed in claim 6, wherein the contact area of each stationary terminal with the corresponding movable terminal is formed to have an inclination so that the contact area comes in contact with the bifurcated part of each movable terminal.

8. A multiple switch as claimed in any of claims 1 through 3, wherein said body is provided with a part to retain alternatively one end of said elastic member so that the urging force is secured in the inoperative direction of the rotary actuator establishing a reversed positional relationship between the inoperative position and the operative position of the rotary actuator.

9. A multiple switch as claimed in in any of claims 1 through 3, wherein the contact area between each movable terminal and each stationary terminal is composed of a thick clad of silver or silver alloy.

10. A multiple switch as claimed in any of claims 1 through 3, wherein said switch is a hook-switch for a telephone set.

11. A multiple switch as claimed in claim 4, wherein the turning locus of the top end of at least one projection belonging to said second projection group has a different radius from the locus of the top end of the other projections belonging to the second projection group.

12. A multiple switch as claimed in claim 4, wherein a contact area of each movable terminal with the corresponding stationary terminal is bifurcated.

13. A multiple switch as claimed in claim 11, wherein a contact area of each movable terminal with the corresponding stationary terminal is bifurcated.

14. A multiple switch as claimed in claim 4, wherein the contact area of each stationary terminal with the corresponding movable terminal is formed to have an inclination so that the contact area comes in contact with a bifurcated part of each movable terminal.

15. A multiple switch as claimed in claim 12, wherein the contact area of each stationary terminal with the corresponding movable terminal is formed to have an inclination so that the contact area comes in contact with the bifurcated part of each movable terminal.

16. A multiple switch as claimed in claim 13, wherein the contact area of each stationary terminal with the corresponding movable terminal is formed to have an inclination so that the contact area comes in contact with the bifurcated part of each movable terminal.

17. A multiple switch as claimed in claim 4, wherein said body is provided with a part to retain alternatively one end of said elastic member so that the urging force is secured in the inoperative direction of the rotary actuator establishing a reversed positional relationship between the inoperative position and the operative position of the rotary actuator.

18. A multiple switch as claimed in claim 14, wherein said body is provided with a part to retain alternatively one end of said elastic member so that the urging force is secured in the inoperative direction of the rotary actuator establishing a reversed positional relationship between the inoperative position and the operative position of the rotary actuator.

19. A multiple switch as claimed in claim 15, wherein said body is provided with a part to retain alternatively one end of said elastic member so that the urging force is secured in the inoperative direction of the rotary actuator establishing a reversed positional relationship between the inoperative position and the operative position of the rotary actuator.

20. A multiple switch as defined in claim 16, wherein said body is provided with a part to retain alternatively one end of said elastic member so that the urging force is secured in the inoperative direction of the rotary actuator establishing a reversed positional relationship between the inoperative position and the operative position of the rotary actuator.

21. A multiple switch as claimed in claim 4, wherein the contact area between each movable terminal and each stationary terminal is composed of thick clad of silver or silver alloy.

22. A multiple switch as claimed in claim 17, wherein the contact area between each movable terminal and each stationary terminal is composed of a thick clad of silver or silver alloy.

23. A multiple switch as claimed in claim 18, wherein the contact area between each movable terminal and each stationary terminal is composed of thick clad of silver or silver alloy.

24. A multiple switch as claimed in claim 19, wherein the contact area between each movable terminal and each stationary terminal is composed of a thick clad of silver or silver alloy.

25. A multiple switch as claimed in claim 20, wherein the contact area between each movable terminal and each stationary terminal is composed of a thick clad of silver or silver alloy.

26. A multiple switch as claimed in claim 4, wherein said switch is a hook-switch for a telephone set.

27. A multiple switch as claimed in claim 21, wherein said switch is a hook-switch for a telephone set.

28. A multiple switch as claimed in claim 22, wherein said switch is a hook-switch for a telephone set.

29. A multiple switch as claimed in claim 23, wherein said switch is a hook-switch for a telephone set.

30. A multiple switch as claimed in claim 24, wherein said switch is a hook-switch for a telephone set.

31. A multiple switch as claimed in claim 25, wherein said switch is a hook-switch for a telephone set.

* * * * *

UNITED STATES PATENT AND TRADEMARK OFFICE
CERTIFICATE OF CORRECTION

PATENT NO. : 4,572,930
DATED : February 25, 1986
INVENTOR(S) : Toshio Kakuta et al.

It is certified that error appears in the above-identified patent and that said Letters Patent is hereby corrected as shown below:

Column 8, line 53, Claim 1, "member" has been left out between "elastic" and "interposed"

Column 8, line 2, Claim 3, "the" has been left out between "of" and "top".

Signed and Sealed this

Twenty-second Day of July 1986

[SEAL]

Attest:

DONALD J. QUIGG

Attesting Officer     Commissioner of Patents and Trademarks